O. A. LEE.
GRAIN SEEDER.
APPLICATION FILED SEPT. 9, 1920.
1,371,101.
Patented Mar. 8, 1921.
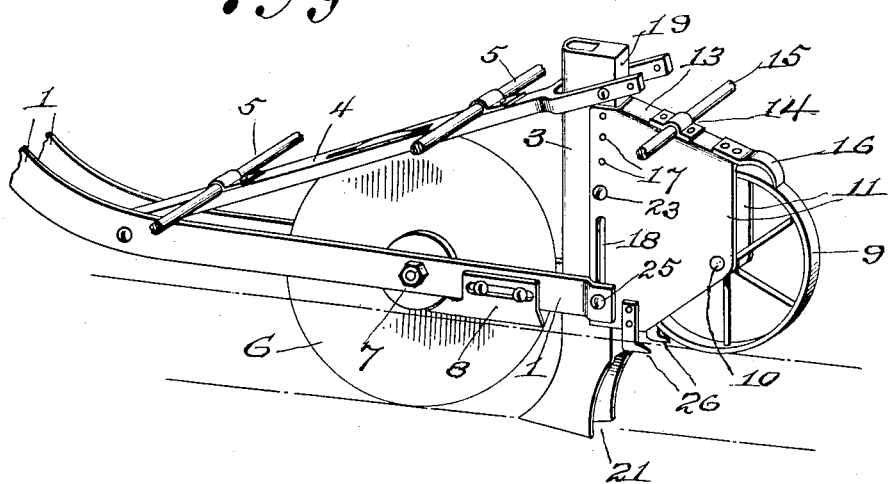
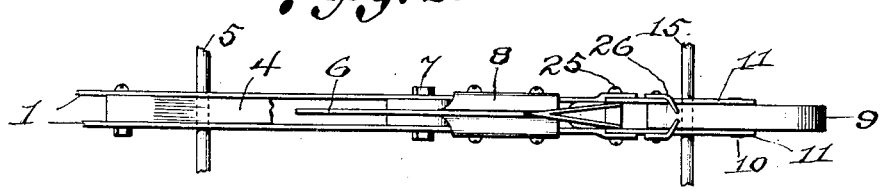
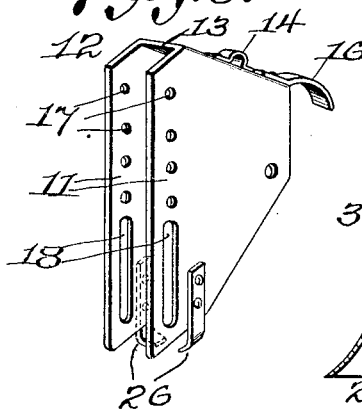  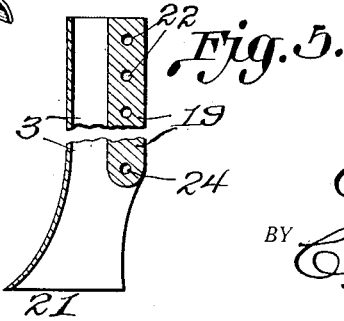

UNITED STATES PATENT OFFICE.

OLE A. LEE, OF GRENORA, NORTH DAKOTA.

GRAIN-SEEDER.

1,371,101.　　　Specification of Letters Patent.　　Patented Mar. 8, 1921.

Application filed September 9, 1920. Serial No. 409,227.

*To all whom it may concern:*

Be it known that I, OLE A. LEE, a citizen of the United States, residing at Grenora, in the county of Williams and State of North Dakota, have invented certain new and useful Improvements in Grain-Seeders, of which the following is a specification.

This invention relates to the class of seeders and planters, and pertains especially to grain seeding or drilling machines.

The object of the invention is to provide a seed or grain drill attachment for regulating the depth of cut of the colter wheel or furrow disk and the position of the grain discharge shoe relative to the colter by means of an adjustable ground surface tread or presser wheel following the shoe.

A further object of the invention is to provide a special hanger for the presser wheel, said hanger having covering blades coöperating with the wheel for covering the seed, and to furnish means for adjusting the hanger so as to vary the position of a colter and the furrow shoe of a seed chute, in a seeding operation.

Various other objects, advantages and improved results are attainable in the manufacture and practical application of the invention, as will hereinafter appear.

In the accompanying drawings forming part of this application:—

Figure 1 is a perspective view showing the application of the invention.

Fig. 2 is an inverted elevation of what is shown in Fig. 1.

Fig. 3 is a detail perspective view of the presser wheel hanger showing its attachments.

Fig. 4 is a sectional view of the colter or furrow cutting disk.

Fig. 5 is a detail sectional view of the seed chute partly broken away.

The same reference characters denote the same parts throughout the several views of the drawings.

In carrying out my invention, while there is a gang or plurality of these seeders employed and connected for draft purposes with a common wheeled vehicle, I am showing only one of such gang or plurality of seeders for the purpose of illustrating my invention, wherein the forward end of the frame 1 is adapted to be attached to a vehicle as usual, and the rear end of the frame 1 is attached to the grain chute 3, hereinafter more particularly referred to. The frame 1 is braced by a top brace bar 4 attached to the frame and to the head of the chute, and this bar has suspending rods 5 for connecting a gang or plurality of the seeders. The colter or furrow cutting disk 6 is journaled in the frame 1 as at 7 and the frame is provided with scrapers 8 for the disk 6.

The important or essential feature of my invention resides in so adjusting the packer or presser wheel as to vary and fix the depth of furrow cut by the colter for the seed chute, and also in having seed coverers coöperate with and in advance of the presser wheel, and in order to accomplish these results in a simple expeditious manner, I journal the packer or presser wheel 9 as at 10 in side members 11 of the lower portion of a casing hanger 12 having a closed top member 13 provided with a keeper 14 for a connecting bar 15, and a scraper 16 for the presser wheel 9. The front portion of the side members 11 has a plurality of holes 17, and a vertical slot 18. Said front portion of the side members 11 fitting the rear solid wall 19 of the grain chute 3 which has a seed or grain discharge furrow shoe 21, and said wall is provided with holes 22 corresponding with the holes 17, for an adjusting bolt or screw as 23. A hole 24 in the lower end of the wall 19 is for a bolt or screw as 25 extending through the rear end of the frame 1 and through the slot 18, so as to secure the frame to the chute and permit the hanger 12 to be adjusted vertically on the chute for varying the elevation or position of the presser wheel and thereby controlling the depth cut of the colter and the position of the seeding shoe. A covering shovel or blade 26 is secured to each of the side members 11 and depends therefrom in advance of the presser wheel for covering the cut or furrow preceding the travel of the presser wheel which packs the furrow.

I do not wish to be understood as confining myself to any particular means for adjustably connecting the presser wheel hanger on the chute, nor do I wish to limit the invention to any particular size and material, but reserve the right to make such changes in the manufacture and practical application of the invention as may come within the scope of the appended claim.

Having thus described my invention what I claim as new and desire to secure by Letters Patent is:—

In a grain seeder, a grain chute, draft frame members overlapping the chute for vertical adjustment of the chute, a casing having its forward end adjustable on the chute and having a slot through which said members are so connected as to permit said adjustment, a surface-tread presser wheel journaled in the rear end of the casing and revolved through the casing, said wheel being adjusted by the casing for varying the furrow depth of the chute, and covering blades secured to and depending from the casing between the wheel and the chute.

In witness whereof I hereunto set my hand in the presence of two witnesses.

OLE A. LEE.

Witnesses:
 H. O. GARAAS,
 GILBERT BRATVOLD.